(12) United States Patent
He et al.

(10) Patent No.: US 9,307,601 B2
(45) Date of Patent: Apr. 5, 2016

(54) INPUT VOLTAGE SENSING FOR A SWITCHING POWER CONVERTER AND A TRIAC-BASED DIMMER

(75) Inventors: Zhaohui He, Austin, TX (US); Rahul Singh, Austin, TX (US); Eric J. King, Dripping Spring, TX (US); John L. Melanson, Austin, TX (US); William A. Draper, Austin, TX (US)

(73) Assignee: Koninklijke Philips N.V., Eindhoven (NL)

( * ) Notice: Subject to any disclaimer, the term of this patent is extended or adjusted under 35 U.S.C. 154(b) by 213 days.

(21) Appl. No.: 13/539,004

(22) Filed: Jun. 29, 2012

(65) Prior Publication Data

US 2013/0002163 A1 Jan. 3, 2013

Related U.S. Application Data

(63) Continuation-in-part of application No. 12/858,164, filed on Aug. 17, 2010, now Pat. No. 8,569,972, and a continuation-in-part of application No. 13/194,531, filed on Jul. 29, 2011, now Pat. No. 8,716,957, and a (Continued)

(51) Int. Cl.
*H05B 37/00* (2006.01)
*H05B 33/08* (2006.01)

(52) U.S. Cl.
CPC ........ *H05B 33/0848* (2013.01); *H05B 33/0815* (2013.01); *Y02B 20/346* (2013.01)

(58) Field of Classification Search
CPC ........... H05B 33/0815; H05B 33/0845; Y02B 20/347
USPC ...... 315/200 R, 246, 194, 211, 216, 217, 225
See application file for complete search history.

(56) References Cited

U.S. PATENT DOCUMENTS

| 4,523,128 A | 6/1985 | Stamm et al. |
| 5,055,746 A | 10/1991 | Hu et al. |

(Continued)

FOREIGN PATENT DOCUMENTS

| CN | 1421986 A | 6/2003 |
| CN | 1459216 A | 11/2004 |

(Continued)

OTHER PUBLICATIONS

Amanci, et al, "Synchronization System with Zero-Crossing Peak Detection Algorithm for Power System Applications", The 2010 International Power Electronics Conference, pp. 2984-2991, Toronto, Ontario, Canada.

(Continued)

*Primary Examiner* — Minh D A
*Assistant Examiner* — Borna Alaeddini
(74) *Attorney, Agent, or Firm* — Terrile, Cannatti, Chambers & Holland, LLP; Kent B. Chambers

(57) ABSTRACT

An electronic lighting system and method described herein control energy provided to an electronic lighting device, such as one or more light-emitting diodes (LEDs) and/or compact fluorescent lamps (CFLs), of the electronic lighting system. A triac-based dimmer phase cuts a line voltage provided to the electronic lighting system. A controller of the electronic lighting system utilizes a probing system to overcome idiosyncrasies of the triac-based dimmer to allow the controller to probe and sense the line voltage. To reduce energy consumption, rather than probing each cycle of the output voltage of the triac-based dimmer, the controller periodically or intermittently probes the output voltage of the triac-based dimmer.

35 Claims, 9 Drawing Sheets

Related U.S. Application Data continuation-in-part of application No. 13/217,174, filed on Aug. 24, 2011, now Pat. No. 8,847,515, and a continuation-in-part of application No. 13/287,257, filed on Nov. 2, 2011, now Pat. No. 8,941,316, and a continuation-in-part of application No. 13/290,032, filed on Nov. 4, 2011, now Pat. No. 8,610,365.

(60) Provisional application No. 61/503,357, filed on Jun. 30, 2011, provisional application No. 61/376,504, filed on Aug. 24, 2010, provisional application No. 61/410,269, filed on Nov. 4, 2010.

(56) References Cited

U.S. PATENT DOCUMENTS

| | | |
|---|---|---|
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |
| 5,604,411 A | 2/1997 | Venkitasubrahmanian et al. |
| 5,629,607 A | 5/1997 | Callahan et al. |
| 5,661,645 A | 8/1997 | Hochstein |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,380,692 B1 | 4/2002 | Newman et al. |
| 6,407,514 B1 | 6/2002 | Glaser et al. |
| 6,510,995 B2 | 1/2003 | Muthu et al. |
| 6,621,256 B2 | 9/2003 | Muratov et al. |
| 6,713,974 B2 | 3/2004 | Patchornik et al. |
| 6,714,425 B2 | 3/2004 | Yamada et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,339,329 B2 | 3/2008 | Makimura et al. |
| 7,656,103 B2 | 2/2010 | Shteynberg |
| 7,719,246 B2 | 5/2010 | Melanson |
| 7,728,530 B2 | 6/2010 | Wang et al. |
| 7,733,678 B1 | 6/2010 | Notohamiprodjo et al. |
| 7,750,580 B2 | 7/2010 | Lu et al. |
| 7,759,881 B1 | 7/2010 | Melanson |
| 7,786,711 B2 | 8/2010 | Wei et al. |
| 7,872,427 B2 | 1/2011 | Scianna |
| 7,982,415 B2 | 7/2011 | Kimura |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost |
| 8,212,492 B2 | 7/2012 | Lam et al. |
| 8,222,832 B2 | 7/2012 | Zheng et al. |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson |
| 8,569,972 B2 | 10/2013 | Melanson |
| 8,581,518 B2 | 11/2013 | Kuang et al. |
| 8,610,364 B2 | 12/2013 | Melanson et al. |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,847,515 B2 | 9/2014 | King et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0208669 A1 | 9/2006 | Huynh et al. |
| 2007/0182338 A1 | 8/2007 | Shteynberg et al. |
| 2007/0182347 A1 | 8/2007 | Shteynberg |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2008/0203934 A1 | 8/2008 | Van Meurs |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2009/0134817 A1 | 5/2009 | Jurngwirth et al. |
| 2009/0135632 A1 | 5/2009 | Sohma |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0213859 A1 | 8/2010 | Shteynberg |
| 2010/0231136 A1 | 9/2010 | Reisenauer et al. |
| 2010/0244726 A1 | 9/2010 | Melanson |
| 2011/0004313 A1 | 1/2011 | De Villiers et al. |
| 2011/0012530 A1* | 1/2011 | Zheng ............... H05B 33/0815 315/294 |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121754 A1 | 5/2011 | Shteynberg |
| 2011/0140628 A1* | 6/2011 | Lei ..................... H05B 33/0815 315/287 |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2011/0316441 A1 | 12/2011 | Huynh |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0112651 A1 | 5/2012 | King et al. |
| 2012/0133291 A1 | 5/2012 | Kitagawa et al. |
| 2012/0286686 A1 | 11/2012 | Watanabe et al. |
| 2013/0015768 A1 | 1/2013 | Roberts et al. |
| 2013/0154495 A1 | 6/2013 | Zhaohui |
| 2013/0193879 A1 | 8/2013 | Sadwick et al. |
| 2014/0009082 A1 | 1/2014 | King et al. |

FOREIGN PATENT DOCUMENTS

| | | |
|---|---|---|
| CN | 1748446 A | 3/2006 |
| CN | 1843061 A1 | 10/2006 |
| CN | 101164383 A | 4/2008 |
| CN | 101505568 A | 8/2009 |
| CN | 101805568 A | 8/2009 |
| CN | 101707874 A | 5/2010 |
| CN | 101835314 | 9/2010 |
| CN | 101926222 | 12/2010 |
| CN | 101959346 A | 1/2011 |
| EP | 1164819 A1 | 12/2001 |
| EP | 2257124 A1 | 1/2010 |
| EP | 2232949 | 9/2010 |
| JP | 2008053181 A | 3/2008 |
| JP | 2009170240 A | 7/2009 |
| WO | 9917591 | 4/1999 |
| WO | 02096162 A1 | 11/2002 |
| WO | 2006079937 | 8/2006 |
| WO | WO2006079937 A1 | 8/2006 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | WO2010035155 A2 | 4/2010 |
| WO | 2011008635 A1 | 1/2011 |

(56) References Cited

FOREIGN PATENT DOCUMENTS

| WO | WO2011008635 A1 | 1/2011 |
|---|---|---|
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Patterson, James, "Efficient Method for Interfacing Triac Dimmers and LEDs", National Semiconductor Corp., pp. 29-32, Jun. 23, 2011, USA.
Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.
Wang Xiao, Phase Control Dimming of the Dimmable Lighting System, Journal of Wuxi University of Light Industry, Jul. 31, 2000, vol. 19, No. 4, pp. 1-3. The Abstract contains a concise explanation in English and the Search Report identifies the following portions as related to the claims in the Present Application: p. 408, right-hand column, section 2, and figures 5-7.
Supertex, Inc., HV9931 Unity Power Factor LED Lamp Driver, pp. 1-7, 2005, Sunnyvale, California, USA. (Per MPEP 609.04(a), Applicant points out that the year of publication is sufficiently earlier than the effective U.S. filed and any foreign priority date so that the particular month of publication is not in issue.).
Supertex, Inc., HV9931 Unity Power Factor LED Lamp Driver, pp. 1-7, 2005, Sunnyvale, California, USA. (Per MPEP 609.04(a), Applicant points out that the year of publication is sufficiently earlier than the effective U.S. filing date and any foreign priority date so that the particular month of publication is not in issue.).
Response to the Written Opinion as filed in Application No. 12737415.5 on Sep. 3, 2014, European Patent Office, pp. 1-17.
International Search Report and Written Opinion issued in the corresponding PCT Application No. PCT/US2012/045108 and mailed on Sep. 3, 2012.
Azoteq, IQs17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.
Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.
Rand, Dustin et al, Issues, models and Solutions for Triac Modulated Phase Dimming of LED Lamps, Power Electronics Specialists Converence, 2007. PESC 2007, IEEE, Jun. 17-21, 2007, pp. 1398-1404, Boston, MA, USA.
Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden, Germany.
Green, Peter, A Ballast That Can Be Dimmed from a Domestic (Phase Cut) Dimmer, International Rectifier, IRPLCFL3 rev. b. pp. 1-12, Aug. 15, 2003, El Segundo, California, USA.
Hausman, Don, Real-Time Illumination Stability Systems for Trailing-Edge (Reverse Phase Control) Dimmers, Lutron RTISS, Lutron Electronics Co. Dec. 2004, pp. 1-4, Coopersburg, PA, USA.
Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.
Engdahl, Tomi, Light Dimmerr Circuits, 1997-2000, www.epanorama.net.
O'Rourke, Conan et al, Dimming Electronic Ballasts, National Lighting Product Information Program, Specifier Reports, vol. 7, No. 3, Oct. 1999, pp. 1-24, Troy, NY, USA.
Supertex Inc., 56W Off-line LED Driver, 120VAC with PFC, 160V, 350mA Load, Dimmer Switch Compatible, DN-H05, pp. 1-20, Jun. 17, 2008, Sunnyvale, California, USA.
Why Different Dimming Ranges, http://www.lutron.com/TechnicalDocumentLibrary/LutronBallastpg3.pdf.
Wu, Tsai-Fu, et al, Single-Stage Electronic Ballast with Dimming Feature and Unity Power Factor, IEEE Transactions on Power Electronics, vol. 13, No. 3, May 1998, pp. 586-597.
Written Opinion, PCT/US2012/045108, The International Bureau of WIPO, Jan. 7, 2014, pp. 1-8.
Lutron, Flourescent Dimming Systems Technical Guide, copyright 2002, Why Different Dimming Ranges?, p. 3, Lutron Electronics Co., Inc., Coopersburg, PA, USA.

\* cited by examiner

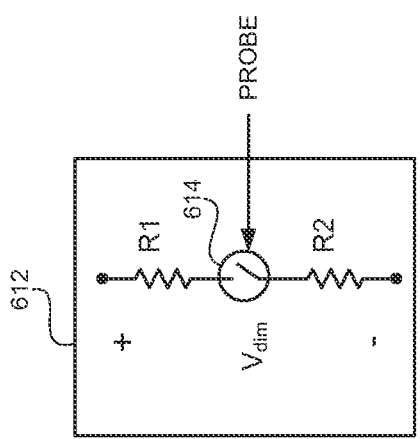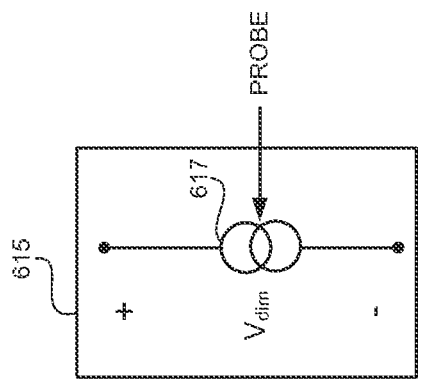
Fig. 6B
Fig. 6C

INPUT VOLTAGE SENSING FOR A SWITCHING POWER CONVERTER AND A TRIAC-BASED DIMMER

CROSS-REFERENCE TO RELATED APPLICATION

The present U.S. Patent Application claims priority under 35 U.S.C. §119(e) to U.S. Provisional Patent Application No. 61/503,357, filed Jun. 30, 2011, which is incorporated herein by reference.

The present U.S. Patent Application is a continuation-in-part and claims priority under 35 U.S.C. §120 to:
1. U.S. patent application Ser. No. 12/858,164 entitled "DIMMER OUTPUT EMULATION", filed Aug. 17, 2010, now U.S. Pat. No. 8,569,972 inventor John L. Melanson (referred to herein as "Melanson I");
2. U.S. patent application Ser. No. 13/194,531 entitled "POWERING HIGH-EFFICIENCY LIGHTING DEVICES FROM A TRIAC-BASED DIMMER", filed on Jul. 29, 2011 now U.S. Pat. No. 8,716,957;
3. U.S. patent application Ser. No. 13/217,174, entitled: "MULTI-MODE DIMMER INTERFACING INCLUDING ATTACH STATE CONTROL", filed Aug. 24, 2011, now U.S. Pat. No. 8,847,515 and inventors: Eric J. King and John L. Melanson, which claims priority under 35 U.S.C. §119(e) to U.S. Provisional Patent Application No. 61/376,504, filed Aug. 24, 2010;
4. U.S. patent application Ser. No. 13/287,257 published as U.S. Patent Publication No. 20120112651 entitled "DUTY FACTOR PROBING OF A TRIAC-BASED DIMMER", filed Nov. 2, 2011, now U.S. Pat. No. 8,941, 316 and inventors Eric J. King and John L. Melanson, which claims priority under 35 U.S.C. §119(e) to U.S. Provisional Patent Application No. 61/410,269, filed Nov. 4, 2010; and
5. U.S. patent application Ser. No. 13/290,032, entitled "SWITCHING POWER CONVERTER INPUT VOLTAGE APPROXIMATE ZERO CROSSING DETERMINATION", filed Nov. 4, 2011 now U.S. Pat. No. 8,610, 365 (referred to herein as "King I"), and inventors Eric J. King and John L. Melanson, which claims priority under 35 U.S.C. §119(e) to U.S. Provisional Patent Application No. 61/410,269, filed on Nov. 4, 2010.

Each of the foregoing patent applications and provisional patent applications having at least one common inventor with the present U.S. Patent Application and are assigned to the same Assignee. The disclosures of each of the foregoing patent applications and provisional patent applications are incorporated herein by reference in their entireties.

BACKGROUND OF THE INVENTION

1. Field of the Invention

The present invention relates generally to electronic systems and more specifically to systems and methods related to input voltage sensing fir a switching power converter and a triac-based dimmer.

2. Description of the Related Art

Electronic lighting devices, such as light-emitting-diodes (LEDs) and compact fluorescent lamps (CFLs) provide more energy efficient light relative to incandescent light bulbs. Accordingly, the more efficient electronic lighting devices are increasingly replacing incandescent light bulbs in lighting systems.

Conventional dimmers used to dim incandescent light bulbs often include a triode for alternating current ("triac"). A triac-based dimmer sets a dimming level by phase cutting an alternating current (AC) input voltage at a particular phase angle to decrease the average amount of power delivered to a load, such as lamp. Incandescent bulbs naturally respond to the phase cut input voltage by reducing their light output. Many electronic lighting devices, such as LEDs and CFLs, are constant current devices, meaning that the electronic lighting devices have a particular brightness for a particular current value. Thus, lighting systems that include electronic lighting devices often utilize a controller to convert the input voltage into a voltage and current useable by the electronic lighting devices.

To respond to the dimming level set by the phase angle of phase cut input voltage, the controller ideally correctly detects the phase angle of the phase cut voltage and regulates a voltage and current for the electronic light devices commensurate with the dimming level. However, determining the phase cut angle of the input voltage has proved challenging, especially when attempting to retain the energy efficiency of the electronic lighting devices.

Ideally, a triac-based dimmer connects and disconnects the input voltage to a load one-time each during a single half-cycle of the input voltage. However, without intervention a triac-based dimmer tends to improperly connect and disconnect the input voltage to the electronic lighting device multiple times during a single half cycle of the input voltage. This oscillation occurs because once a triac begins conducting, the triac will continue to conduct until current flowing through the triac falls below a hold current value. Electronic lighting devices often draw only 10% of the current drawn by an incandescent light bulb while producing an equivalent amount of light. Consequently, without intervention the electronic lighting device may draw less than the hold current causing the triac to prematurely connect and disconnect the input voltage to the load during a phase cut when the triac should remain nonconductive. Additionally, some circuits can cause the triac to prematurely disconnect after the phase cut of the input voltage.

Improper functioning of the triac-based dimmer can cause difficulties in detecting the zero crossings of the input voltage. Improper or non-detection of the zero crossings of the input voltage can be disruptive to the proper operation of the controller in controlling the electronic lighting devices.

SUMMARY OF THE INVENTION

In one embodiment of the present invention, a method includes probing an output of a triode for alternating current ("triac")-based dimmer every Nth half cycle of an alternating current (AC) output voltage of the dimmer to allow a controller of a lighting system to sense the output voltage from a time when the triac connects an input voltage source to an output of the dimmer until an occurrence of a predetermined event. N is an integer greater than 1.

In another embodiment of the present invention, a controller to control a switching power converter of a lighting system. The controller is capable to generate a control signal to control probing an output of a triode for alternating current ("triac") based dimmer every Nth half cycle of an alternating current (AC) output voltage of the dimmer to allow the controller to sense the output voltage from a time when the triac connects an input voltage source to an output of the dimmer until an occurrence of a predetermined event. N is an integer greater than 1. The controller is further capable to sense the output voltage from the time when the triac connects an input voltage source to an output of the dimmer until an occurrence of a predetermined event.

In a further embodiment of the present invention, a method includes discharging parasitic capacitors in a power and lighting control system to allow sensing of a dimmer output voltage of a dimmer that tracks an input voltage to the dimmer. The method further includes sensing the dimmer output voltage In another embodiment of the present invention, an apparatus includes a parasitic discharge circuit coupled to a dimmer in a power and lighting control system. The parasitic discharge circuit is capable to discharge parasitic capacitors in the power and lighting control system to allow sensing of a dimmer output voltage of the dimmer that tracks an input voltage to the dimmer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6B and 6C depict exemplary dimmer output voltage probing circuits.

DETAILED DESCRIPTION

Figure 1:
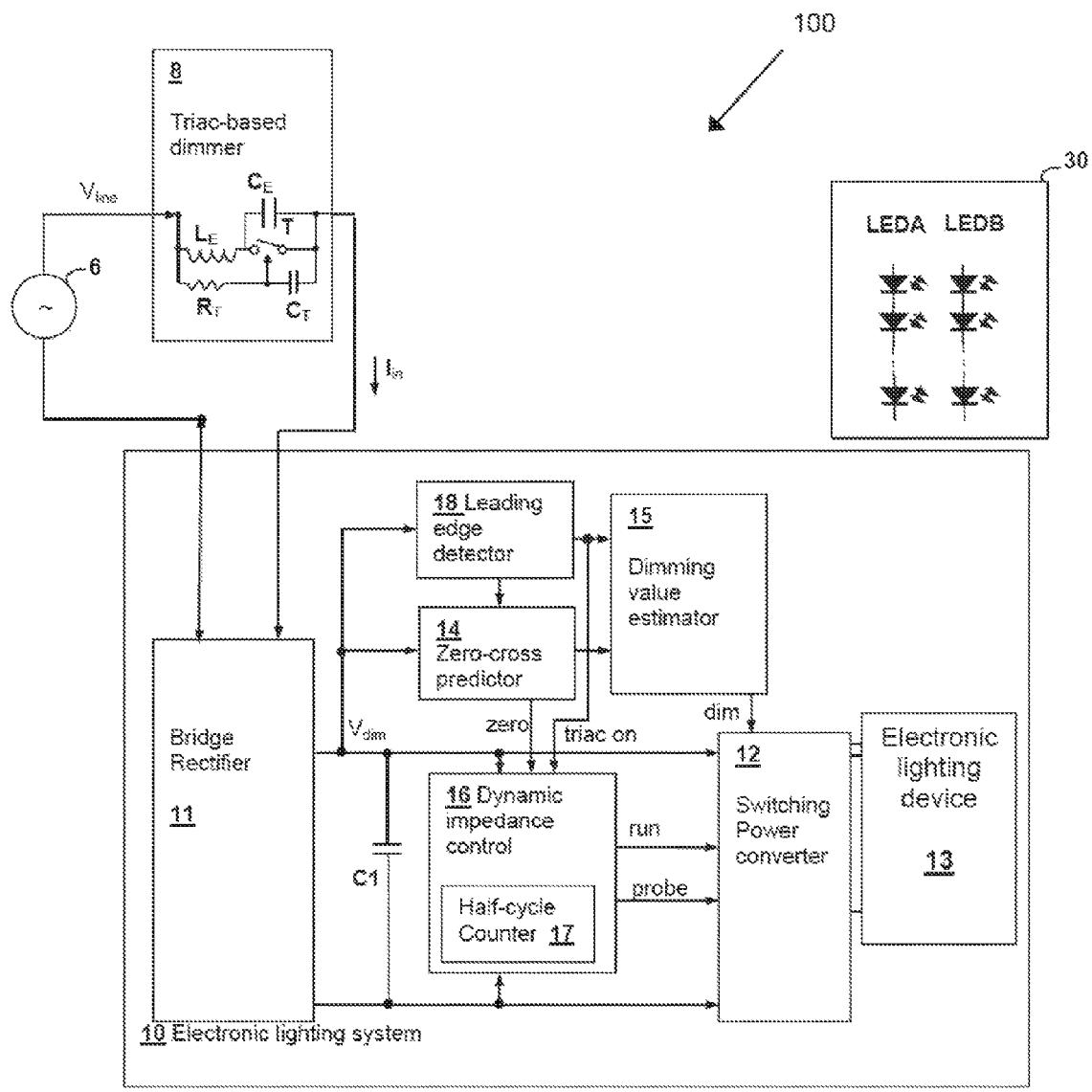
FIG. 1 is a block diagram depicting a power and lighting control system.

An electronic lighting system and method described herein control energy provided to an electronic lighting device, such as one or more light-emitting diodes (LEDs) and/or compact fluorescent lamps (CFLs), of the electronic lighting system. A triac-based dimmer phase cuts an input voltage provided to the electronic lighting system. A controller of the electronic lighting system utilizes a probing circuit to overcome idiosyncrasies of the triac-based dimmer to prevent the dimmer from prematurely disconnected and, thus, allowing the controller to sense a dimmer output voltage. To reduce energy consumption, rather than probing each cycle of the output voltage of the triac-based dimmer, the controller periodically or intermittently probes the output voltage of the triac-based dimmer.

In at least one embodiment, energy supplied to the electronic lighting devices is varied in accordance with a dimming value determined from a phase cut angle of an alternating current (AC) input voltage. In at least one embodiment, a triac-based dimmer connects and disconnects (or vice versa) the AC input voltage to the electronic lighting system. In at least one embodiment, the electronic lighting system efficiently senses the input voltage while still achieving an efficient dimming operation. In at least one embodiment, the electronic lighting system includes a switching power converter, a controller to control the switching power converter, and a load that includes one or more electronic lighting devices. The switching power converter can be any type of switching power converter including a single stage switching power converter, or a multi-stage switching power converter, such as a 2-stage switching power converter.

In at least one embodiment, the electronic lighting system senses the dimmer output voltage by probing a rectified output voltage of the dimmer periodically or intermittently. Probing an output of a triac-based dimmer every Nth half cycle of an alternating current (AC) output voltage of the dimmer allows the controller of the lighting system to sense the output voltage from a time when the triac connects an input voltage source to the output of the dimmer until a time when the triac disconnects the input voltage source from the output of the dimmer. N is an integer greater than 1, which reduces possible energy losses due to probing relative to probing each cycle of the dimmer output voltage. Additionally, N can vary over time or remain constant. In at least one embodiment, probing the output voltage involves allowing the controller to sense an actual value of the dimmer output voltage. Periodic or intermittent probing of the dimmer output voltage allows the controller to, for example, correctly correct errors and reduce drift, or eliminate them, as, for example, a dimming value of the dimmer changes. In at least one embodiment, the dimming value indicated by the phase angle of the phase cut dimmer output voltage is used by the controller to determine an amount of current to supply to the electronic lighting devices.

Probing the output voltage of the dimmer allows the controller to determine one or more parameters of the lighting system. For example, in at least one embodiment, probing the dimmer output voltage allows the controller to determine whether a dimmer is present and, if so, the type of dimmer, such as a leading edge or trailing edge type dimmer. In at least one embodiment, probing the dimmer output voltage also allows the dimmer to determine a frequency of the dimmer output voltage. In at least one embodiment, probing the dimmer output voltage also allows the controller to determine zero crossings of the dimmer output voltage. In at least one embodiment, probing the dimmer output voltage results in the electronic lighting system drawing additional energy that is not needed for the electronic lighting devices.

Probing the dimmer output voltage periodically or intermittently reduces the amount of additional energy drawn. In at least one embodiment, the controller probes the dimmer output voltage one out of every N half-cycles of the dimmer output voltage. N is an integer. In at least one embodiment, N is an odd integer, which allows the controller to probe both positive and negative cycles of the dimmer output voltage and eliminate any direct current (DC) offset accumulation in, for example, circuits of the triac-based dimmer. In at least one embodiment, N is greater than or equal to 9 and less than or equal to 51, such as N equal 25 or 27. The greater the value of N, probing occurrences are less frequent and, thus, more efficient overall. However, the lesser the value of N, the more frequent the probing events, which can result in more accurate knowledge of the parameters detected by the controller based on the dimmer output voltage. Thus, in at least one embodiment, the selection of N is a trade-off between energy efficiency and accurate knowledge.

In at least one embodiment, the controller probes the input voltage to the electronic lighting system by applying an impedance level to an output of the triac-based dimmer that ensures proper operation of timing circuits in the dimmer. In at least one embodiment, the applied impedance level is less than or equal to a specified value to keep the triac of the triac-based dimmer connected until either a trailing edge phase cut by a trailing-edge type dimmer or until a zero crossing at the end of a cycle of the input voltage for a leading edge type dimmer. The probing can extend across the balance of the half-cycle of the AC voltage source, or may be terminated as soon as sufficient information has been gathered to correctly predict the zero-crossing time.

In at least one embodiment, in lieu of probing, the switching power converter includes a parasitic discharge resistor that (i) discharges parasitic capacitances that can cause the triac-based dimmer to prematurely disconnect the input voltage from the switching power converter while (ii) preventing significant charging of a capacitor in parallel with the triac. By simultaneously discharging the parasitic capacitors and preventing charging the parallel capacitor, the voltage across the parasitic discharge resistor accurately represents the dimmer output voltage, which is the input voltage to the switching power converter. Thus, the controller can sense the input voltage by sensing the voltage across the parasitic discharge resistor. In at least one embodiment, the parasitic discharge resistor is used in conjunction with a single stage switching power converter. In at least one embodiment, the parasitic discharge resistor is used in conjunction with a multi-stage, such as a 2-stage, switching power converter.

Reaming now to FIG. 1, a power and lighting system 100 includes AC line voltage source 6 provides an AC line voltage $V_{line}$ to an electronic light source 10 through a triac-based dimmer 8. The line voltage $V_{line}$ is, for example, a nominally 60 Hz/110 V line voltage in the United States of America or a nominally 50 Hz/220 V line voltage in China and Europe. In at least one embodiment, the dimmer 8 is actually designed for operation with incandescent bulbs having a power consumption of 40 W or greater. Electronic lighting system 10 controls electronic lighting device 13 to generate light. Electronic lighting device 13 is, for example, one or more LEDs and/or CFLs arranged in any desirable configuration. The two strings of series connected LEDs, LEDA and LEDB, represents one embodiment of electronic lighting device 13. Electronic lighting device 13 generally consumes less power than an incandescent light bulb with equivalent light output. For example, in at least one embodiment, a 100 W equivalent light output LED-based electronic lighting system 10 consumes 13 W of power. Thus, the 13 W LED-based electronic lighting system 10 consumes 13% of the energy consumed by a 100 W incandescent light bulb. Because the electronic lighting system 10 and an incandescent light bulb operate from the same line voltage $V_{line}$, the input current $I_{in}$ drawn by the electronic lighting system 10 is much less than the input current drawn by an incandescent light bulb. Consequently, without intervention by the electronic lighting system 10, the input current $I_{in}$ can fall below the hold current of the triac-based dimmer 8. Therefore, the triac T in triac-based dimmer 8 can fail to trigger properly due to the reduced current conducted through the triac T while the triac T conducts and connects the power line voltage source 6 to the electronic lighting system 10. In electronic lighting system 10, the dimming value of triac-based dimmer 8 is determined from the width of the phase cut sine wave of rectified dimmer output voltage $V_{dim}$, and the electronic lighting system 10 utilizes the dimming value to control the magnitude of the current supplied electronic lighting device 13. However, in at least one embodiment, if the triac-based dimmer 8 prematurely disconnects or oscillates during a phase cut portion of the line voltage $V_{line}$, the electronic lighting system 10 may not accurately determine the dimming value. Therefore, obtaining a correct dimming value is dependent on the timing circuit in triac-based dimmer 8 properly timing the position of the leading edge of the cut sine wave of rectified dimmer output voltage $V_{dim}$ at least until the time of an approximate next zero-crossing of AC line voltage $V_{line}$ is correctly determined.

Within the block depicting triac-based dimmer 8, a model equivalent circuit is shown that is useful for describing the operation of the triac T and timing circuits within an actual triac-based dimmer 8. The switch g illustrates operation of the triac T itself, which connects the AC voltage line source 6 and electronic lighting system 10 to conduct current $I_{in}$ and disconnects the AC voltage line source 6 and electronic lighting system 10 when the current $I_{in}$ drops below a hold current value. Initially, when switch g is open, EMI capacitor CE (also often referred to as a "snubber" capacitor) and the timing circuit formed by timing resistor RT and timing capacitor CT charge through the load presented by the electronic lighting system 10 at the output terminal of triac-based dimmer 8 and the neutral terminal of the voltage line source 6. Once capacitor CT is charged to a threshold voltage magnitude, switch g closes (i.e., the gate of the triac is triggered) and AC line voltage $V_{line}$ is provided to the output of triac-based dimmer through an inductor LE, which is provided for EMI filtering and to reduce lamp buzz (acoustic noise in an incandescent filament). Once switch g is closed, switch g remains closed (i.e., the triac continues to conduct) until the magnitude of current $I_{in}$ conducted through triac-based dimmer 8 falls below the hold current of the triac T. However, if an insufficiently low impedance load is connected to the output of the triac, the stored energy from capacitor CE, which has been dumped into inductor LE, will return to capacitor CE as the parallel combination of capacitor CE and inductor LE begins to oscillate. When the current through inductor LE falls below the hold current of the triac T, the triac will turn off.

In order to prevent the above-described mis-triggering, e.g. premature disconnect of triac-based dimmer 8, electronic lighting system 10 includes a dynamic impedance control circuit 16 that applies a damping impedance level sufficient to prevent the re-triggering of the triac in triac-based dimmer 8. A leading edge detector 18 detects a rise in rectified dimmer output voltage $V_{dim}$ caused by a turn-on event of triac-based dimmer 8 and asserts a control signal "triac on". In response to assertion of the control signal triac on, dynamic impedance control 16 applies a sufficiently low damping impedance level to prevent the re-triggering of the triac in triac-based dimmer 8 by damping the resonant circuit formed by capacitor CE and inductor LE. The impedance at the input of electronic lighting system 10 is maintained at or below the requisite damping impedance level until a predetermined time period has passed. The predetermined time period is determined for the range of triac-based dimmer 8 designs with which the electronic lighting system 10 operates and the circuit conditions present in electronic lighting system 10. In at least one embodiment, the predetermined time period is approximately 200 μs in duration. The requisite damping impedance level also varies with the particular design of triac-based dimmer 8, but is generally between 100 ohms and 1 k ohms.

After the predetermined time period has passed, in at least one embodiment, electronic lighting system 10 draws enough input current $I_{in}$ to maintain the triac-based dimmer 8 in a conducting state while energy needed to supply electronic lighting device 13 for the cycle of the dimmer output voltage $V_{dim}$ is being transferred. The minimum current required to maintain the conducting state, i.e. the hold current of the particular triac T, is generally between 25 mA and 70 mA. After energy is transferred, electronic lighting system 10 then enters a high impedance state, disabling switching power converter 12 so that a sudden change in impedance due to activation of switching power converter 12 does not trigger triac-based dimmer 8 by re-charging capacitor CT to the trigger threshold during any remaining portion of the half-cycle of AC line voltage $V_{line}$ for which the corresponding triac output cycle has already been terminated.

In order to ensure that the next leading edge of the output of triac-based dimmer 8 occurs at the correct time, proper operation of the timer circuit formed by capacitor CT and resistor RT must be ensured. At the next zero-crossing time of AC line voltage $V_{line}$, and from that time until triac-based dimmer 8 turns on, a path for the input current $I_{in}$ that is charging timing capacitor CT is provided at the input of electronic lighting system 10. Further, to keep the triac T connected, the impedance presented at the output of triac-based dimmer 8 should be low enough to avoid a voltage drop across the inputs of electronic lighting system 10 that would substantially affect the trigger point of the triac, e.g., the time at which switch g closes. In order to prevent the above-described mis-operation of triac-based dimmer 8, electronic lighting system 10 includes a zero-cross prediction circuit 14 that predicts or detects a zero-cross time of AC line voltage $V_{line}$ by observing dimmer output voltage Vdim, and dynamic impedance control circuit 16 ensures that a sufficiently low impedance, referred to as the "glue" impedance herein, is presented at the input terminals of replacement lighting device from the zero-cross time until the turn-on event is detected by leading edge detection circuit 18, during a time referred to herein as the "glue interval". Thus, by applying the glue impedance during the glue intervals, in at least one embodiment, dynamic impedance control circuit 16 ensures that the timing of the timing circuit in triac-based dimmer 8 is not disrupted by the absence of a passive low-impedance load such as an incandescent light bulb, at the output of the dimmer, while avoiding dissipating excess energy by applying the glue impedance only during the glue interval during which the triac in triac-based dimmer 8 is off. Melanson I describes exemplary systems and methods for generating the glue impedance. To determines a duty factor of triac-based dimmer 8 from the time period between the zero-crossing and the turn-on time of the triac in triac-based dimmer 8, the electronic lighting system 10 determines an accurate estimate or measurement of the zero-cross time of the dimmer output voltage $V_{dim}$.

In some instances, the electronic lighting system 10 probes the output of the triac-based dimmer 8 to sense the line voltage $V_{line}$ during all or part of a cycle of the dimmer output rectified dimmer output voltage $V_{dim}$, i.e. during all or part of a half cycle of the line voltage $V_{line}$. In at least one embodiment, by sensing the line voltage $V_{line}$ from at least when the triac T conducts and, thus, connects the line voltage source 6 to the electronic lighting system 10 until the triac T stops conducting and, thus, disconnects the line voltage source 6 from the electronic lighting system 10, the electronic lighting system can derive information to properly operate the electronic lighting system 10. During probing intervals, which occur after the triac T in triac-based dimmer 8 has turned on, another specified minimum "probing" conductance (maximum probing impedance) is applied to the output of triac-based dimmer 8 until the occurrence of a predetermined event, such as the occurrence of the next approximate zero-cross time of AC line voltage $V_{line}$.

The probing impedance is applied so that the triac T in triac-based dimmer 8 remains conductive and that the timing circuit in triac-based dimmer 8 continues to operate accurately. The probing interval may extend all the way to the zero-cross time, or may be terminated once sufficient information is derived to accomplish the purposes of the probing cycle. Exemplary purposes include accurately predicting a zero-cross time of the dimmer output voltage $V_{dim}$, the type of triac-based dimmer 8 (such as a trailing edge or leading edge type dimmer), the frequency of the line voltage $V_{line}$. In at least one embodiment, accurately predicting the next zero-cross of the line voltage $V_{line}$ generally occurs by extending the probing interval to at least after the peak of AC line voltage $V_{line}$, so that any ambiguity between different values of dimmer duty factor due to identical voltages at the leading edge can be resolved by knowing on which side of the peak of AC line voltage $V_{line}$ the leading edge of the output waveform of triac-based dimmer 8 occurs.

A dimming value estimator 15 determines a dimming value for controlling the current supplied to electronic lighting device 13, by measuring the time interval between assertion of control signal triac on by leading edge detector 18 and the assertion of control signal zero by zero-cross detector, which is a direct measure of the duty factor of triac-based dimmer 8. Dynamic impedance control circuit 16 may be a controllable current sink, a resistor having a series-connected switching transistor, or other suitable circuit for shunting current across input terminals IN, or switching power converter 12 can be designed to provide a minimum conductance level during operation, and controlled such that the minimum conductance level is met during the probing intervals.

The glue impedance used for proper timing is generally an impedance substantially equal to 100 ohms or less, which represents a conductance of less than or equal to 0.01 mhos. Such an impedance, if present across the dimmer output terminals during the active phase of triac-based dimmer would require power transfer or dissipation on the order of that caused by a 100 W light bulb, but since the glue impedance is applied while the triac is off, the power transfer is only that required to operate the timer circuit formed by capacitor CT and resistor RT. However, the energy drawn by the minimum conductance level applied during the damping period (the damping impedance) and the minimum current drawn by switching power converter 12 during the active period still may be more energy than the energy to operate electronic lighting device 13.

In at least one embodiment, a half-cycle counter 17 within dynamic impedance control 16 is used to periodically allow switching power converter 12 to operate, so that operation of switching power converter 12 is coordinated with the turn-on time of the triac triac-based dimmer 8, but so that active cycles of triac-based dimmer 8 can be skipped except when it is necessary to probe triac-based dimmer 8 to properly detect the zero-cross time of AC line voltage $V_{line}$ and to operate switching power converter 12 to transfer sufficient energy to operate electronic lighting device 13. The glue impedance is still applied from the predicted zero-cross time until the turn-on time of triac-based dimmer 8 so that the internal circuits of triac-based dimmer will continue to operate properly during the idle time. Dynamic impedance control circuit 16 generates a control signal run, which permits switching power converter 12 to start energy transfer if energy transfer is needed. Dynamic impedance control circuit 16 also generates a control signal probe, which requires switching power converter 12 to present the minimum conductance level at the output of triac-based dimmer 8 so that a probing cycle is provided to accurately time the duty factor of triac-based dimmer 8. In order to prevent a DC offset from accumulating in the timing circuit of triac-based dimmer 8, control signal probe is asserted at intervals of odd half-cycles of AC line voltage $V_{line}$, so that switching power converter 12 will draw most of the energy from triac-based dimmer 8 during half-cycles of alternating polarity, any remaining requirements for transfer during subsequent assertions of control signal run should have a net zero effect, since any consistent operating pattern in the subsequent intervals of control signal run will also be applied to half-cycles of opposite polarity. In at least one embodiment, electronic lighting system 10 is designed so that switching power converter 12 operates when control signal run is asserted. In other embodiments, the control signal run merely permits switching power converter 12 to operate if needed to replenish energy storage within switching power converter. Also, dynamic impedance control 16 may activate additional loading to provide the damping and/or probing impedance, or switching power converter 12 can be designed to present a conductance no less than the conductance provided by the maximum damping impedance level. Alternatively, switching power converter 12 can have a non-uniform energy transfer characteristic so that more current is drawn during the damping time period than is drawn during the active time period.

Figure 2:
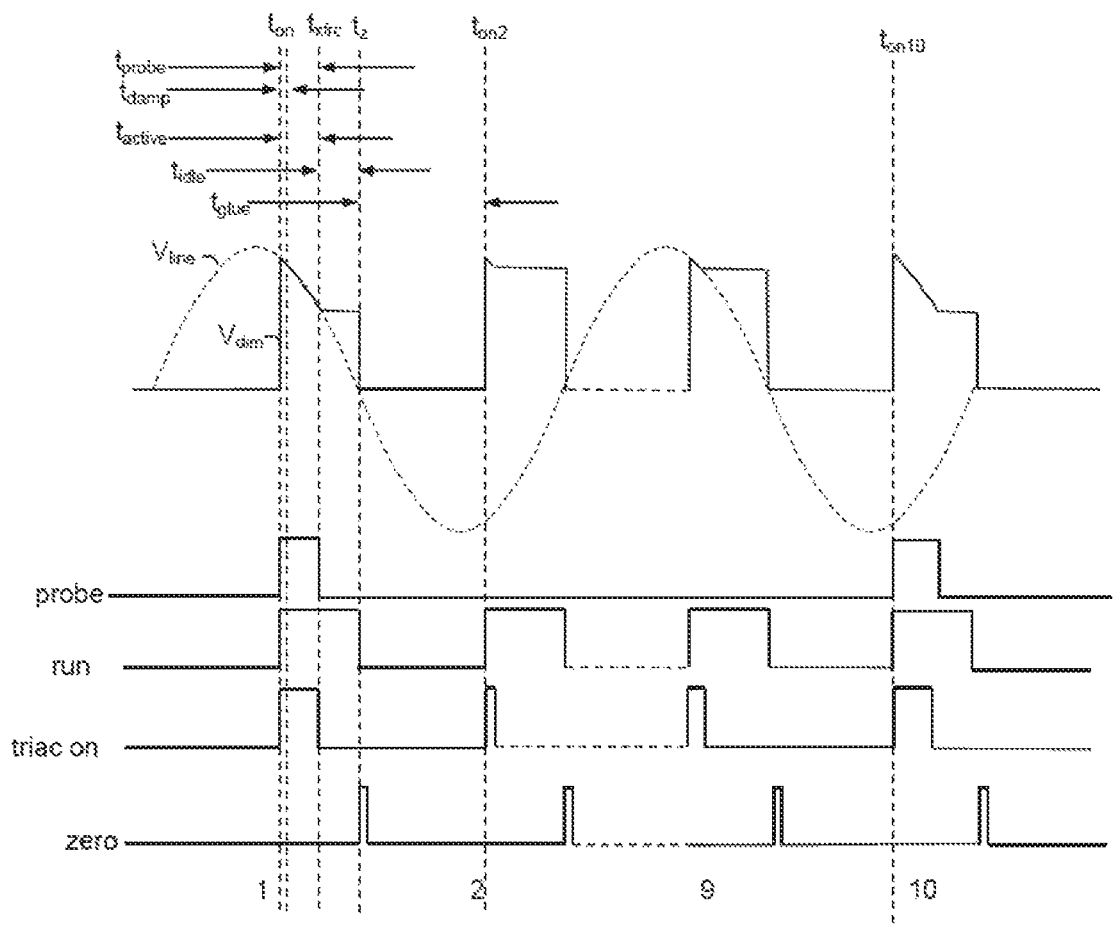
FIG. 2 is a signal waveform diagram illustrating various exemplary phases of operation of lighting circuits.

Reaming now to FIG. 2, the various phases of operation of electronic lighting system 10 are illustrated with reference to cycles of AC line voltage $V_{line}$ and the phase cut sine waveforms of rectified dimmer output voltage $V_{dim}$. During a predetermined time period tdamp, e.g. 100 μs, immediately following the triac turn-on event at time ton, the damping impedance level is presented by operation of dynamic impedance control 16, when leading edge detector 18 detects the triac turn-on event and asserts control signal triac on. At least a portion of the damping impedance can be provided by operation of switching power converter 12 which operates during time period tactive beginning just after time ton. In the depicted embodiment, control signal run is provided to switching power converter 12 to indicate to switching power converter 12 both when switching power converter 12 is permitted to start an energy transfer cycle, and how long the cycle may potentially extend, i.e., the maximum duration of the active cycle is the duration of the high-state pulse of control signal run. Control signal run is asserted at time ton along with control signal probe, to cause switching power converter 12 to present the minimum conductance at the output of triac-based dimmer so that the duty factor of triac-based dimmer can be probed.

Once the possibility of resonant re-triggering of the triac has been avoided, e.g., after the energy associated with the turn-on event has been dissipated or stored for operating electronic lighting device 13, while energy is still needed by switching power converter 12 for the present cycle of AC line voltage $V_{line}$, transfer of energy is performed by switching power converter 12, and the current through triac-based dimmer 8 is maintained at or above the level of the hold current required by the triac in triac-based dimmer 8 at least throughout the remainder of the probing time period tprobe. After the energy transfer is complete at time txfrc, the input of electronic lighting system 10 enters a high-impedance state during idle time interval sidle and the triac in triac-based dimmer circuit 8 turns off. Then, once zero-crossing prediction circuit 14 indicates, by asserting control signal zero, that a zero-crossing of AC line voltage $V_{line}$ is occurring, dynamic impedance control 16 asserts the glue impedance at the output of triac-based dimmer 8, so that the timer circuit in triac-based dimmer 8 formed by capacitor CT and resistor RT will charge properly and generate the next leading edge of dimmer output voltage Vdim at the proper time ton2. At time ton2, control signal probe is not asserted, and so energy transfer is only performed as needed at each assertion of control signal run until time ton10, at which control signal probe is again asserted on the ninth half-cycle of AC line voltage $V_{line}$ after the previous assertion of control signal probe.

Zero-cross prediction circuit 14 uses either analog techniques, such as multiple threshold comparators to trigger waveshape generators, e.g., a parabolic waveform generator that provides a close approximation to a sinusoidal waveshape, or digital techniques such as using an analog-to-digital converter (ADC) with a processing block that can extrapolate the zero crossing location from the shape of the cut sine waveform of dimmer output voltage $V_{dim}$. A relatively simple circuit can be used to implement the zero-crossing prediction circuit 14, since even a very low resolution ADC can be used to predict the zero-crossing location and generate control signal zero. A phase lock loop (PLL) can alternatively be used to predict the zero-crossing location by performing phase comparisons with the rectified dimmer output voltage $V_{dim}$ and a reference timer clock output. Using a PLL also can provide a consistent time base for operation of half-cycle counter 17 and a measure of the frequency of AC line voltage $V_{line}$.

Figure 3:
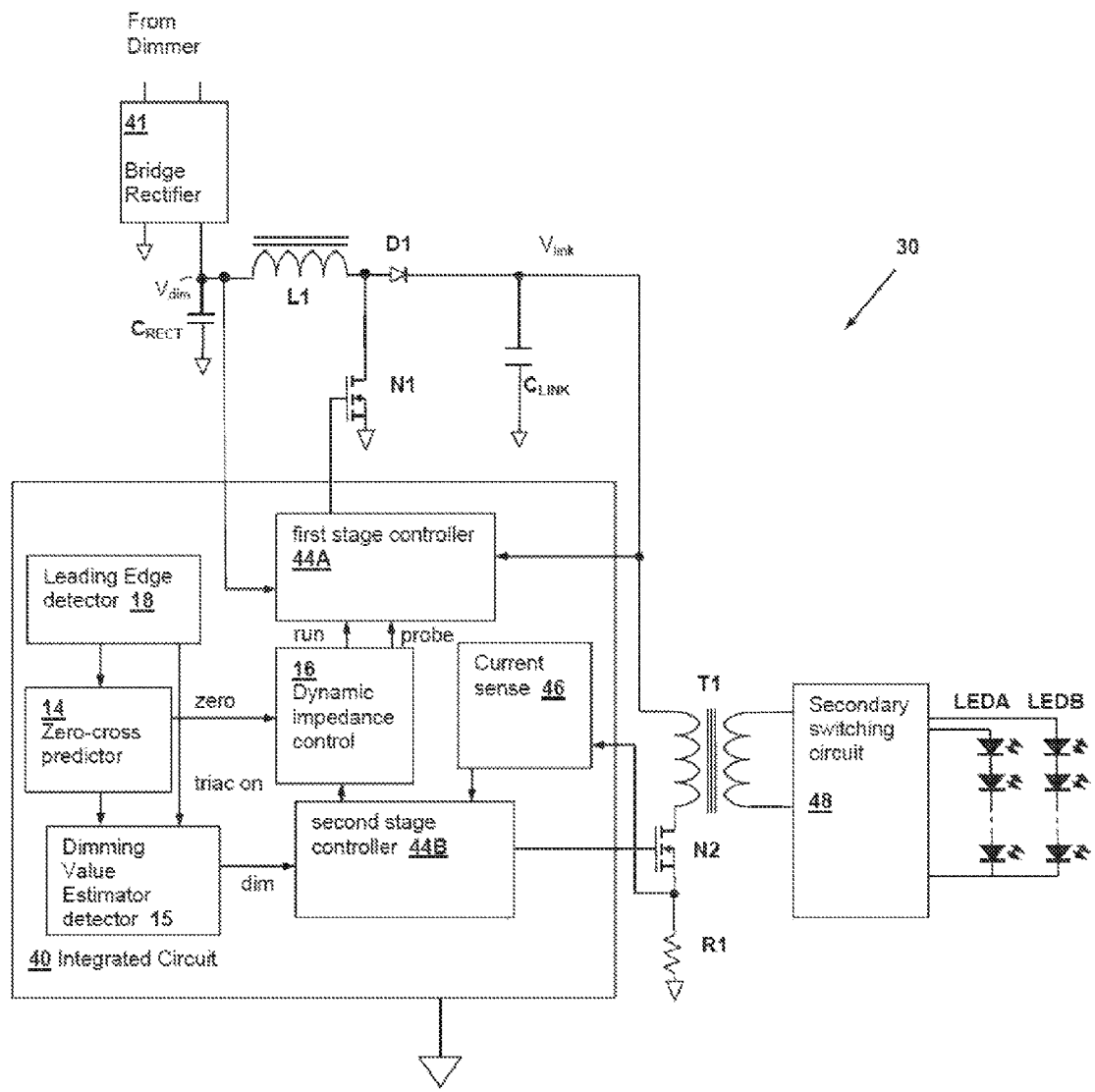
FIG. 3 is a simplified schematic diagram of a power and lighting control system.

Reaming now to FIG. 3, a lighting circuit 30 is shown. The circuit of FIG. 3 is provided to illustrate details of a two-stage switching power converter that may be used to implement switching power converter 12 of FIG. 1. The output of a dimmer is provided to a bridge rectifier 41 that generates a rectified dimmer output voltage Vdim. A capacitor CRECT provides filtering of higher frequency switching components generated by a buck input stage implemented by inductor L1, switching transistor N1, diode D1 and capacitor CLINK. A resistor R1 provides for current-sensing of the primary current provided through transistor N2. An integrated circuit 40 provides control of transistor N1 from a first stage controller 44A and further controls a flyback converter stage from a second stage controller 44B that switches transistor N2 to provide current through a transformer T1 in response to feedback provided from current sensing circuit 46.

Second stage controller provides information about energy requirements to dynamic impedance control circuit 16, which provides control indication to first stage controller 44A to dynamically control the impedance presented at the input terminal that receives the output of bridge rectifier 41, thereby controlling the impedance presented to the output of triac-controller dimmer 8. Zero-cross predictor 14, leading edge detector 18 and dimming value estimator 15 operate as described above with reference to FIG. 1. Electronic lighting device 13 may be supplied through a secondary switching circuit 48 that alternates application of the secondary current between LED strings, which may be of different color in order to provide a color profile that varies with the dimming value dim or under other control input. First stage controller 44A is activated by control signal run and control signal probe as described above.

Figure 4A:
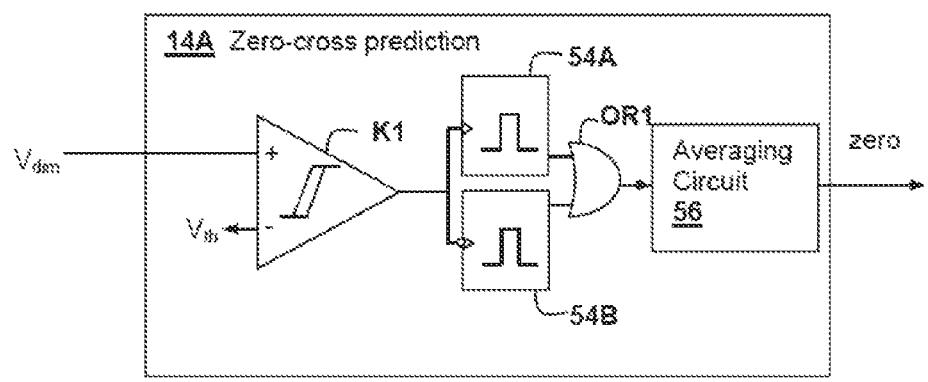
FIGS. 4A-4B are block diagrams of zero-cross determining circuits that may be used in circuits of the lighting circuits of FIGS. 1 and 3.

Referring now to FIG. 4A, a zero-cross detection circuit 14A, as may be employed in the above-described embodiments of the electronic lighting system 10 (FIG. 1) and lighting circuit 30 (FIG. 3). A hysteresis comparator K1 detects when rectified dimmer output voltage $V_{dim}$ exceeds threshold voltage Vth, and one-shots 54A and 54B generate pulses that are combined by logical-OR gate OR1 to provide a pulse at each zero-crossing of AC line voltage $V_{line}$. An averaging circuit 56, such as a digital processing block or PLL, is included to reconstruct the input AC line voltage $V_{line}$ phase from the rectified dimmer output voltage VDIM, which may be accomplished as described in Melanson I and King I. The output of zero-cross prediction circuit 14A is a pulse that is asserted at the end of each half-cycle of AC line voltage $V_{line}$, and indicates to one of the above-described circuits, when to apply the glue impedance or current level at the output of triac-based dimmer circuit 8.

Figure 4B:
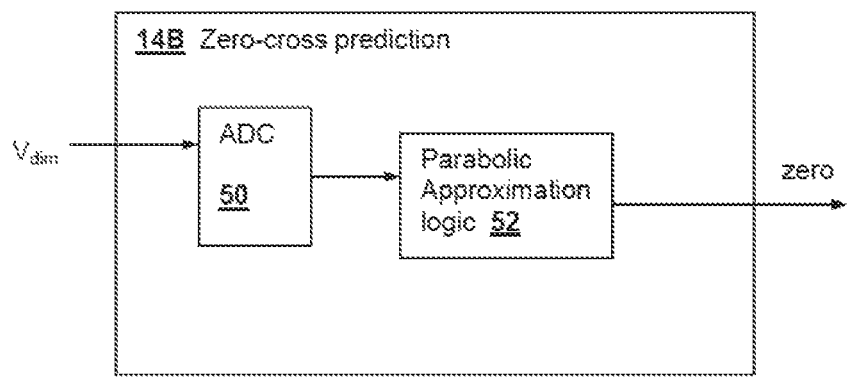

Referring now to FIG. 4B, an alternative zero-cross prediction circuit as may be employed in the electronic lighting system 10 and the lighting circuit 30. An ADC 50 provides input to parabolic approximation logic 52 that generates control signal zero according to the predicted location of the zero-crossings of AC line voltage $V_{line}$. ADC 50 may be replaced by a pair of comparators, and parabolic approximation logic 52 may be replaced by an analog circuit that performs piecewise approximation to approximate the waveshape of AC line voltage $V_{line}$ from the cut sine wave shape of rectified dimmer output voltage Vdim. Melanson I and King I describe exemplary embodiments of the parabolic approximation logic 52.

Figure 5:
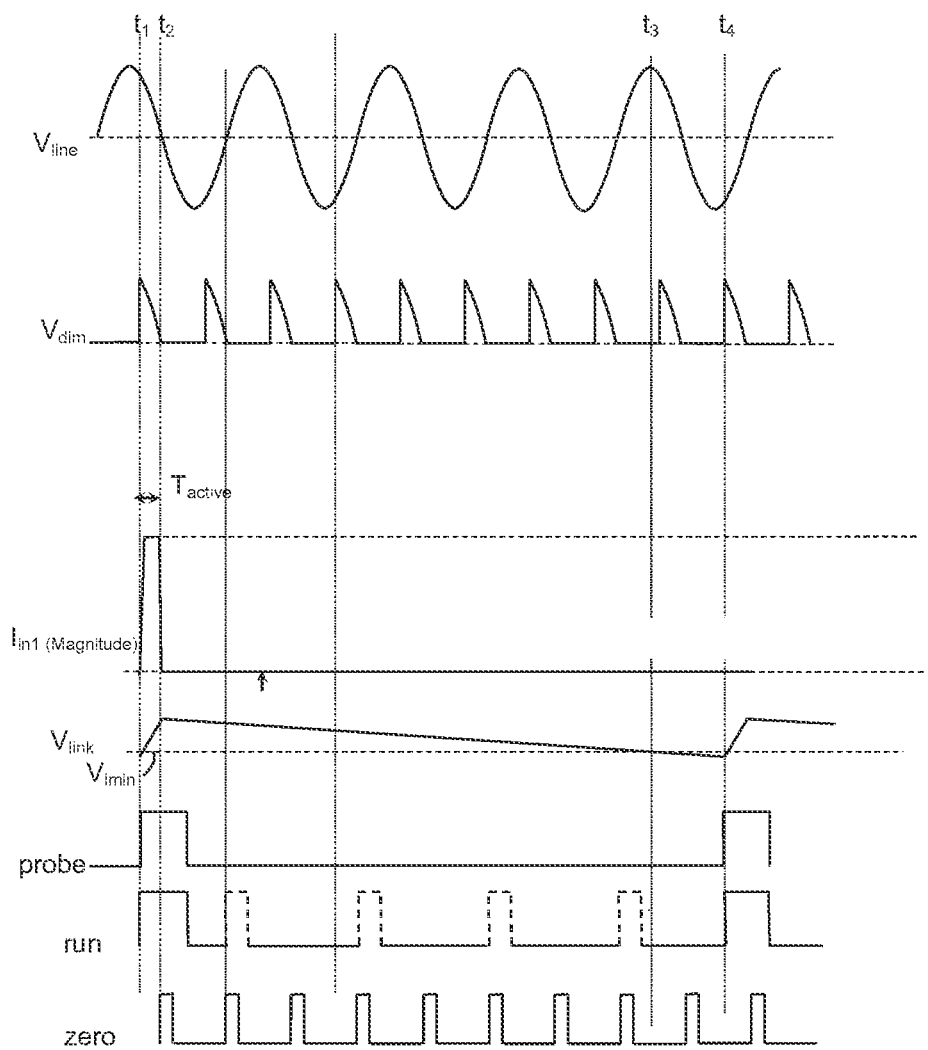
FIG. 5 is a signal waveform diagram illustrating signals within a lighting circuit.

Referring now to FIG. 5, exemplary signals associated with the electronic lighting system 10 (FIG. 1) and the lighting circuit 30 (FIG. 3) are shown in a signal waveform diagram. At time t1, a leading edge of rectified dimmer output voltage $V_{dim}$ indicates a triac turn-on event and for time period tactive, energy is drawn from the output terminals of triac-based dimmer 8 of FIG. 1. Current waveform Iin1 corresponds to an input current drawn by electronic lighting system 10 of FIG. 1, having a substantially constant value during the interval between times t1 and t2. Transitions in current waveform Iin1 cannot be too abrupt, or oscillation of EMI inductor LE and EMI capacitor CE can result, causing the triac to turn off at the wrong time. Voltage waveform Vlink corresponds to the output of first stage controller 44A in the circuit depicted in FIG. 3. At time t3, link voltage Vlink has fallen below link threshold voltage V1min and at time t4, the next odd-numbered half-cycle after the previous probing period begins, so first stage controller 44A is again activated to charge link capacitor CLINK. Half-cycles prior to a particular numbered half-cycle of alternate polarity, during which control signal probe is asserted, can be enabled for operation of first stage controller 44A, as shown by the dashed lines in control signal run. Otherwise, once the proper relationship between the actual power needed by electronic lighting device 13 and the power level expected by triac-controller dimmer 8, a fixed relationship such as the 9th half-cycle scheme illustrated above, which is suitable for lighting devices that draw approximately 11% of the power consumed by an ordinary incandescent bulb, can be employed.

Figure 6A:
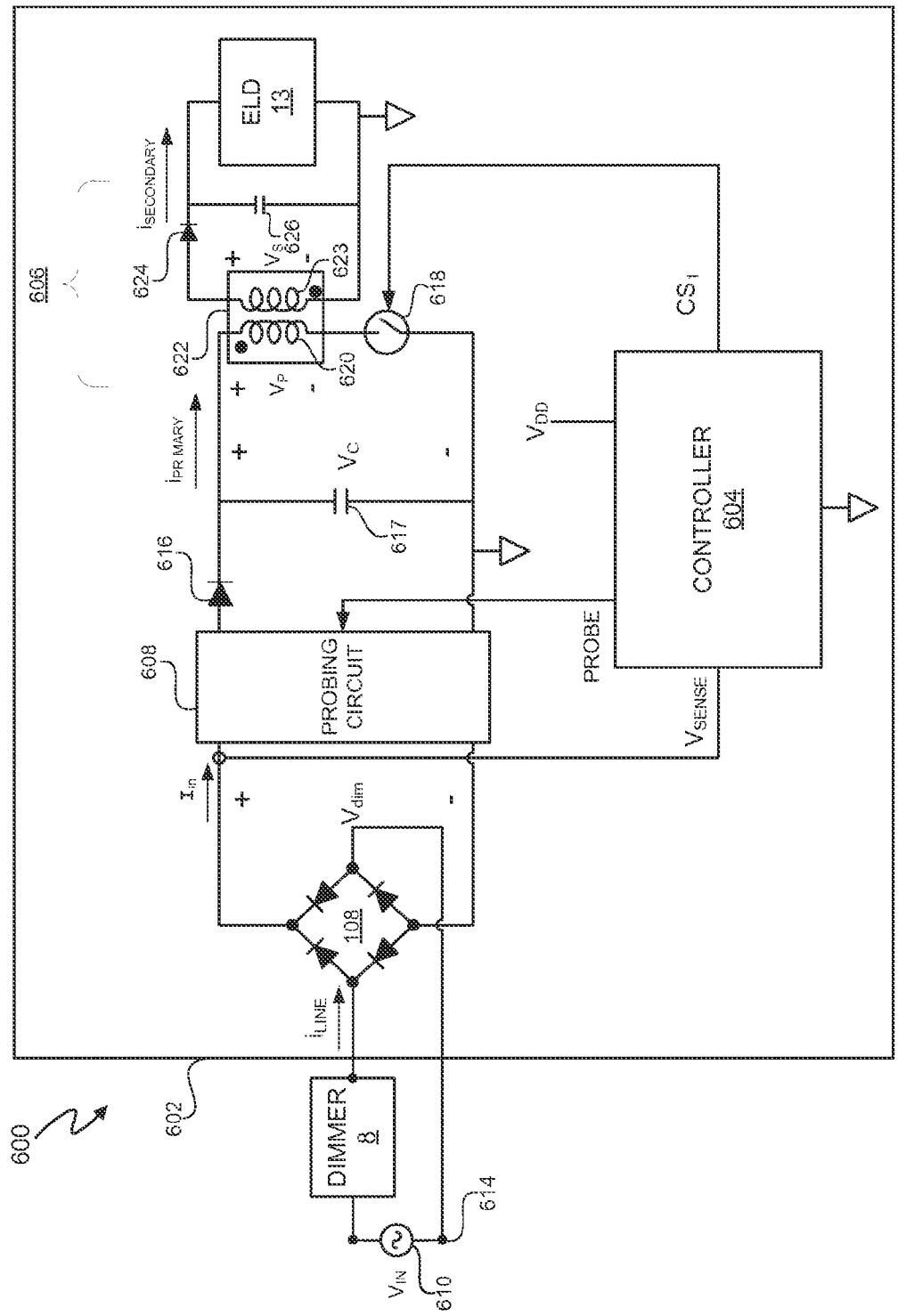
FIG. 6A is power and lighting control system that includes a dimmer output voltage probing circuit.

FIG. 6A depicts a power and lighting control system 600, which represents one embodiment of the power and lighting control system 100 of FIG. 1. The power and lighting control system 600 includes electronic lighting system 602, which represents one embodiment of electronic lighting system 100. The electronic lighting system 602 includes a controller 604 that controls the operation of the single-stage, flyback-type switching power converter 606 and, thereby, controls the light output of electronic lighting device (ELD) 13. During normal operation, the controller senses the dimmer output voltage $V_{dim}$ via the sense signal $V_{SENSE}$. The sense signal $V_{SENSE}$ can be a current or voltage and can be an approximately exact or a scaled version of the dimmer output voltage $V_{dim}$. In at least one embodiment, the electronic lighting system 602 is contained within a housing of a lamp.

The electronic lighting system 602 includes a probing circuit 608 to probe the dimmer output voltage $V_{dim}$. The probing circuit 608 provides the dimmer output voltage $V_{dim}$ every Nth half cycle of the dimmer output voltage $V_{dim}$ to allow the controller 604 to sense the dimmer output voltage $V_{dim}$ from a time when the triac of the triac-based dimmer 8 connects the input voltage source 610 to the output of the dimmer 8 until a time when the triac disconnects the input voltage source 610 from the output of the dimmer 8. N is an integer greater than 1. N is an integer greater than 1 indicates that the probing circuit 608 does not probe the dimmer output voltage $V_{dim}$ during every cycle of the dimmer output voltage $V_{dim}$. In at least one embodiment, probing circuit 608 draws additional power from the input voltage source 610. Thus, using the probing circuit 608 decreases the efficiency of the electronic lighting system 602. By using a value of N that is greater than 1, the probing circuit 608 reduces energy losses by approximately 1/N relative to probing each cycle of the dimmer output voltage $V_{dim}$. Additionally, since the characteristics of the dimmer output voltage $V_{dim}$ can change over time, probing the dimmer output voltage $V_{dim}$ can increase the accuracy of the sensed voltage $V_{SENSE}$.

Thus, in at least one embodiment, the value of N represents a potential trade-off between efficiency and accuracy. In at least one embodiment, N is greater than or equal to 9 and less than or equal to 51, such as N equal 25 or 27. In at least one embodiment, N varies over time so that the probing circuit 608 intermittently probes the dimmer output voltage $V_{dim}$. In at least one embodiment, N is constant so that the probing circuit 608 periodically probes the dimmer output voltage $V_{dim}$. N can be an even integer, an odd integer, or can vary between even and odd over time. Utilizing an odd value for N can eliminate any DC offset accumulation in, for example, circuits of the triac-based dimmer 8. The input voltage source 610 is any AC voltage source that can provide sufficient energy to the electronic lighting system 602. In at east one embodiment, the input voltage source is the line voltage source 8.

In at least one embodiment, probing the dimmer output voltage $V_{dim}$ allows the controller 602 to derive information regarding characteristics of the power and lighting system 600. For example, in at least one embodiment, probing the dimmer output voltage $V_{dim}$ allows the controller 602 to (i) detect and/or estimate zero crossings of the dimmer output voltage $V_{dim}$, (ii) detect the frequency of the dimmer output voltage $V_{dim}$, and/or (iii) detecting a dimmer type, such as a leading edge or trailing edge type dimmer.

FIGS. 6B and 6C depict exemplary embodiments of the probing circuit 608. Referring to FIGS. 6A and 6B, the particular make-up and configuration of the probing circuit 608 is a matter of design choice. In at least one embodiment, the purpose of the probing circuit 608 is to allow the dimmer output voltage to track a rectified version of the input voltage $V_{IN}$ until an occurrence of a predetermined event. Probing circuit 612 represents one embodiment of probing circuit 608. To initiate a probing interval (also referred to as a probing event) with probing circuit 612, controller 602 generates and asserts a pulse of the probe signal PROBE, switch 614 conducts, which introduces a resistance of resistors R1 and R2 across the output of the dimmer 8 and the neutral terminal 614 of input voltage source 610. In at least one embodiment, switch 614 is an n-channel field effect transistor (FET). The resistance value of resistors R1 and R2 is sufficient to draw sufficient current through the triac of the dimmer 8 to prevent the triac from disconnecting prior to reaching an occurrence of a predetermined event. The event can be, for example, a particular value, such as a predetermined voltage level of the dimmer output voltage $V_{dim}$ or completion of a particular function, such as obtaining sufficient information from the dimmer output voltage $V_{dim}$ to derive the desired information regarding the characteristics of the power and lighting system 600. In at least one embodiment, the predetermined voltage level is an approximately zero voltage of the dimmer output voltage $V_{dim}$. To terminate a probing interval, the controller 602 deasserts the PROBE signal, which causes switch 614 to cease conducting.

FIG. 6C depicts probing circuit 615, which represents another embodiment of the probing circuit 608. Probing circuit 615 includes a constant current source 617, which is controlled by the control signal PROBE. During operation, the control signal PROBE activates the constant current source 615 so that the probing circuit 613 presents a low impedance to the output of the dimmer 8. The constant current source 617 draws sufficient current through the triac of the dimmer 8 to prevent the triac from disconnecting prior to reaching an occurrence of the previously described predetermined event.

To control the light output of the electronic lighting device 13, the controller 604 controls the duty cycle of control signal $CS_1$ in accordance with the dimming level indicated by the phase angle of the dimmer output voltage $V_{dim}$. Note, the phase angle of the dimmer output voltage $V_{dim}$ is representative of the duty cycle of the triac of triac-based dimmer 8 and vice versa. The input current $I_{in}$ flows through diode 616 as long as the dimmer output voltage $V_{dim}$ is greater than the capacitor voltage $V_C$ across capacitor 617 plus the intrinsic forward bias voltage of diode 616. When control signal $CS_1$ causes switch 618 to conduct, the primary current $i_{PRIMARY}$ energizes the primary-side coil 620 of transformer 622. Switch 618 can be any type of switch and is, in at least one embodiment, a FET. When controller 602 generates the control signal $CS_1$ to cause the switch 618 to stop conducting, the primary-side voltage $V_p$ reverses polarity, i.e. "flys back", and the dot configuration of the transformer 622 produces a secondary-side voltage $V_S$ across the secondary-side coil 623 that forward biases the diode 624. The forward biased diode 624 allows the secondary-side current $i_{SECONDARY}$ to charge capacitor 626. In at least one embodiment, capacitor 626 is large enough so that the secondary-side current $i_{SECONDARY}$ provided to the electronic lighting device 13 is approximately constant, which produces an approximately constant light brightness and, in at least some embodiments, the color. Adjusting the duty cycle of the control signal $CS_1$ in accordance with the dimming level allows the controller 602 to control the value of the secondary-side current $i_{SECONDARY}$ and, thus, control the brightness and, in at least some embodiments, the color of the light produced by the electronic lighting device 13.

Figure 7:
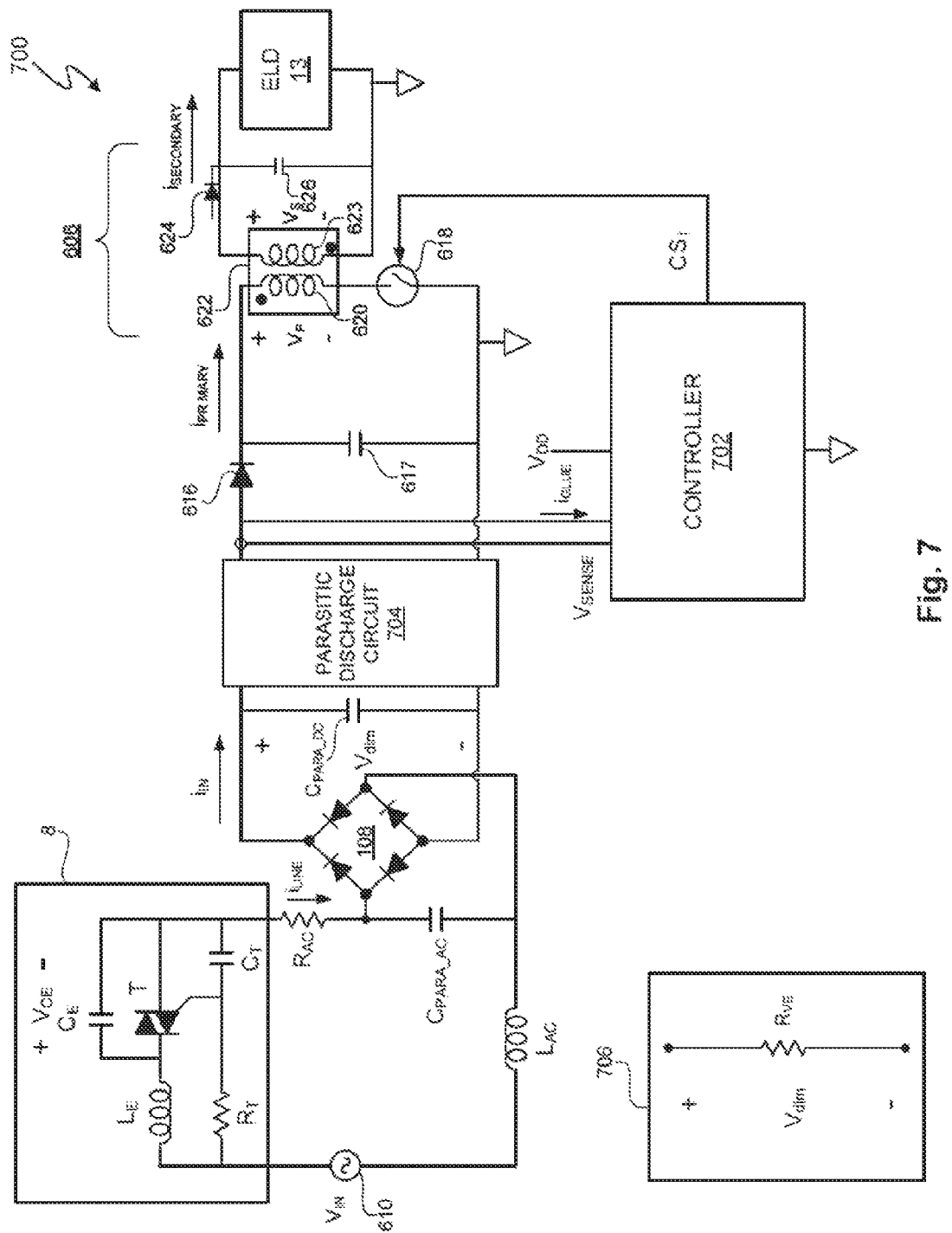
FIG. 7 depicts a power and lighting control system that includes a parasitic discharge circuit.
Figure 8:
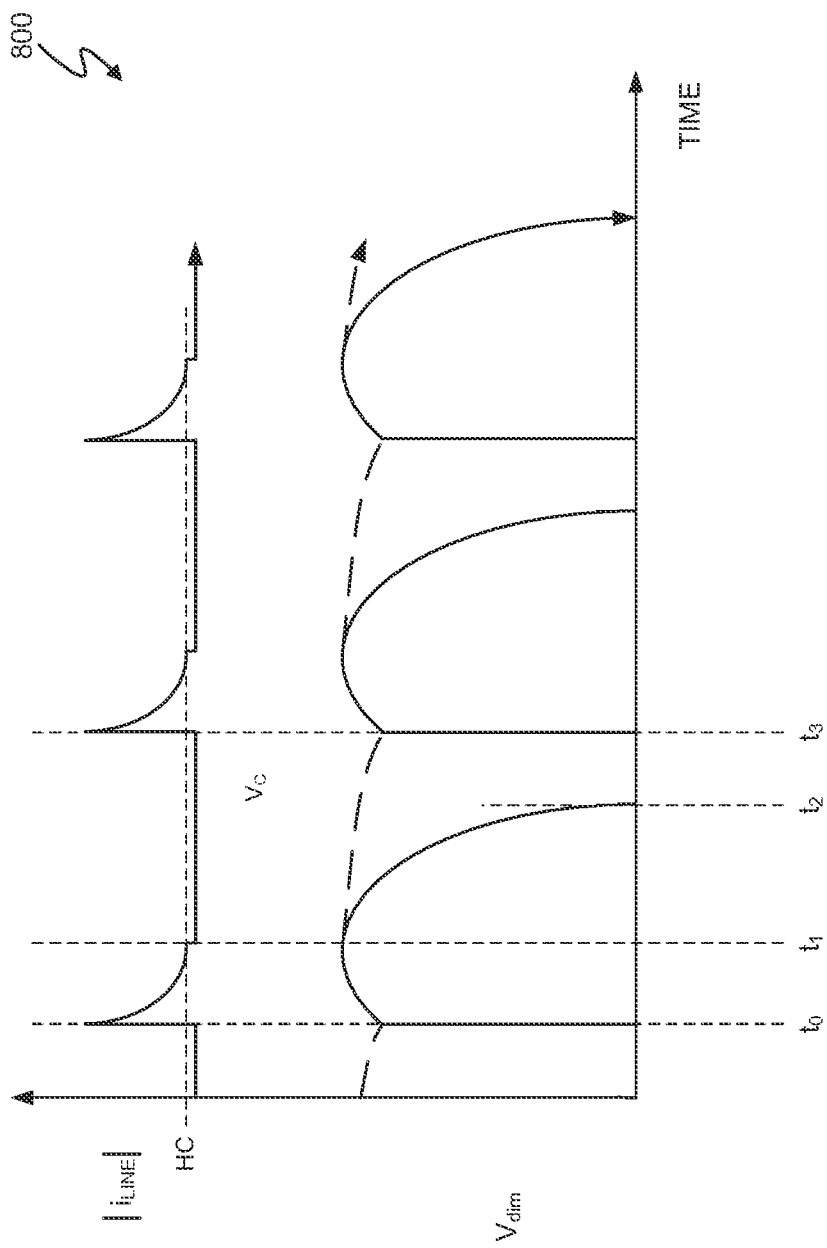
FIG. 8 depicts exemplary current and voltage waveforms associated with an exemplary operation of the power and lighting control system of FIG. 7.

FIG. 7 depicts a power and tight control system 700 that includes a parasitic discharge circuit 704. FIG. 8 depicts exemplary current and voltage waveforms 800 present during an exemplary operation of the power and light control system 700. The line current $i_{LINE}$ in FIG. 8 is depicted as an absolute value, which is representative of the input current Referring to FIGS. 7 and 8, during operation of the power and light control system 700, when the triac T conducts at time $t_0$, the line current $i_{LINE}$ rises and charges the parasitic capacitor $C_{PARA\_AC}$. In addition to charging capacitor 617, the input current $I_{in}$ also charges the parasitic capacitor $C_{PARA\_DC}$. The voltage across the snubber capacitor $C_E$ is approximately 0V while the triac T conducts. Resistor $R_{AC}$ and inductor $L_{AC}$ represent the respective intrinsic resistance and inductance of the conductors.

The line current $i_{LINE}$ decreases as the dimmer output voltage $V_{dim}$ increases. At time $t_1$, the capacitor voltage $V_C$ plus the intrinsic forward bias voltage of the diode 616 exceeds the dimmer output voltage $V_{dim}$, and the diode 616 becomes reverse biased, i.e. non-conductive. The voltage $V_C$ across capacitor 617 slowly decays until the triac T begins conducting again at time $t_3$. When the diode 616 is non-conductive, the impedances of the power and light control system 700 to the left of the diode 616 are too large to allow the line current $i_{LINE}$ to remain above the hold current value HC. Without the voltage exposing resistor $R_{VE}$, the parasitic capacitors would remain charged after time $t_1$ during a cycle of the dimmer output voltage $V_{dim}$ and hold dimmer output voltage $V_{dim}$ at approximately the value of the dimmer output voltage $V_{dim}$ at time $t_1$.

In at least one embodiment, the capacitance of the snubber capacitor CE is much larger than the capacitance of the parasitic capacitors $C_{PARA\_AC}$ and $C_{PARA\_DC}$. For example, in at least one embodiment, the capacitance of the snubber capacitor is 100 times greater than the capacitance of each of the parasitic capacitors $C_{PARA\_AC}$ and $C_{PARA\_DC}$, e.g. approximately 100 nF to approximately 1 nF. The time constant of the combination of the snubber capacitor CE and the voltage exposing resistor $R_{VE}$ is sufficiently large so that the time constant of the dimmer 8 is approximately unchanged and the voltage across the snubber capacitor CE remains approximately 0V while the triac T is nonconductive.

In at least one embodiment, the parasitic discharge circuit 704 discharges the parasitic capacitors $C_{PARA\_AC}$ and $C_{PARA\_DC}$ so that the dimmer output voltage $V_{dim}$ faithfully tracks the input voltage $V_{IN}$ even after the triac T stops conducting. In at least one embodiment, the parasitic discharge circuit 704 discharges the parasitic capacitors $C_{PARA\_AC}$ and $C_{PARA\_DC}$ without significantly affecting a time constant associated with the snubber capacitor CE. In at least one embodiment, the parasitic discharge circuit avoids affecting a time constant associated with the snubber capacitor CE by limiting the input current $I_{in}$ and, thus, not allowing significant amounts of charge to reach the snubber capacitor CE while the triac T is nonconductive. By preventing the snubber capacitor from charging and, thus, developing a voltage across the snubber capacitor CE, the voltage $V_{CE}$ across the snubber capacitor remains at approximately 0V. Since the voltage $V_{CE}$ across the snubber capacitor is approximately 0V, the dimmer output voltage $V_{dim}$ is approximately equal to a rectified version of the input voltage $V_{IN}$.

The voltage exposing resistor $P_{VE}$ of exemplary parasitic discharge circuit 706 represents one embodiment of the parasitic discharge circuit 704. The voltage exposing resistor $R_{VE}$ has a sufficiently low resistance relative to the capacitance of the parasitic capacitors $C_{PARA\_AC}$ and $C_{PARA\_DC}$ to provide a discharge path and a time constant so that the voltage across the parasitic capacitors $C_{PARA\_AC}$ and $C_{PARA\_DC}$ follows the input voltage $V_{IN}$ while the triac T is nonconductive. Thus, the voltage across the voltage exposing resistor $R_{VE}$ follows the input voltage $V_{IN}$ while the triac T is nonconductive. Thus, the controller 702 is able to essentially sense the actual dimmer output voltage $V_{dim}$. The resistance value of the resistor $R_{VE}$ is set to achieve the result of exposing the dimmer output voltage $V_{dim}$ to the controller 702 without significantly changing the time constant of the dimmer 8. With a timer capacitance of 47 nF-100 nF, a snubber capacitor CE of approximately 100 nF, and parasitic capacitors $C_{PARA\_AC}$ and $C_{PARA\_DC}$ of approximately 1 nF, the resistance of the voltage exposing resistor $R_{VE}$ is, for example, 100 Mohms. In at least one embodiment, the controller 702 does not utilize a probing circuit, and the remainder of the power and lighting system 700 and the controller 702 otherwise function as previously described.

Thus, a probing circuit probes a dimmer output voltage every N cycles of the dimmer output voltage to allow the electronic lighting system to efficiently sense the dimmer output voltage for all or part of a non-zero portion of a cycle of the dimmer output voltage. In another embodiment, a voltage exposing resistor $R_{VE}$ exposes the dimmer output voltage to a controller during each entire cycle of the dimmer output voltage.

Although embodiments have been described in detail, it should be understood that various changes, substitutions, and alterations can be made hereto without departing from the spirit and scope of the invention as defined by the appended claims.

What is claimed is:

1. A method comprising:
controlling energy transfer in a switching power converter; and
during the controlling of energy transfer in the switching power converter, probing an output of a triode for alternating current ("triac")-based dimmer only every Nth half cycle of an alternating current (AC) output voltage of the dimmer to allow a controller of a lighting system to sense the output voltage from a time when the triac connects an input voltage source to an output of the dimmer until an occurrence of a predetermined event, wherein N is an integer greater than 1.

2. The method of claim 1 wherein the predetermined event is a time when the triac disconnects the input voltage source from the output of the dimmer.

3. The method of claim 1 wherein the predetermined event is when the output voltage reaches a predetermined threshold value.

4. The method of claim 1 wherein N varies over time.

5. The method of claim 1 wherein N is a constant.

6. The method of claim 1 wherein N is odd.

7. The method of claim 1 further comprising:
detecting an approximate zero crossing of the output voltage of the dimmer from the sensed output voltage of the dimmer.

8. The method of claim 1 further comprising:
detecting a type of the dimmer from the sensed output voltage of the dimmer.

9. The method of claim 1 wherein probing the output of a triac-based dimmer comprises:
introducing a resistance coupled to the output of the dimmer sufficient to prevent the triac from disconnecting prior to reaching a predetermined voltage level.

10. The method of claim 1 wherein probing the output of a triac-based dimmer comprises:
introducing a current source coupled to the output of the dimmer sufficient to prevent the triac from disconnecting prior to reaching a predetermined voltage level.

11. The method of claim 9 wherein the predetermined voltage level is an approximately zero voltage of the output voltage of the dimmer.

12. The method of claim 1 further comprising:
operating the lighting system in accordance with information derived from the sensed output voltage of the dimmer.

13. The method of claim 12 wherein the lighting system includes one or more light emitting diodes.

14. An apparatus comprising:
a controller to control energy transfer in a switching power converter of a lighting system, wherein the controller is configured to:
during control of energy transfer in the switching power converter, generate a control signal to control probing an output of a triode for alternating current ("triac") based dimmer only every Nth half cycle of an alternating current (AC) output voltage of the dimmer to allow the controller to sense the output voltage from a time when the triac connects an input voltage source to an output of the dimmer until an occurrence of a predetermined event, wherein N is an integer greater than 1.

15. The apparatus of claim 14 wherein the predetermined event is a time when the triac disconnects the input voltage source from the output of the dimmer.

16. The apparatus of claim 14 wherein the predetermined event is when the output voltage reaches a predetermined threshold value.

17. The apparatus of claim 14 wherein N varies over time.

18. The apparatus of claim 14 wherein N is a constant.

19. The apparatus of claim 14 wherein N is odd.

20. The apparatus of claim 14 wherein the controller is further configured to detect an approximate zero crossing of the output voltage of the dimmer from the sensed output voltage of the dimmer.

21. The apparatus of claim 14 wherein the controller is further configured to detect a type of the dimmer from the sensed output voltage of the dimmer.

22. The apparatus of claim 14 further comprising:
a probing circuit coupled to the controller and an output of the dimmer, wherein the probing circuit comprises a switch and a resistor coupled to the switch, wherein the control signal controls the switch to couple the resistor to the dimmer and prevent the triac from disconnecting prior to reaching a predetermined voltage level.

23. The apparatus of claim 22 wherein the predetermined voltage level is an approximately zero voltage of the output voltage of the dimmer.

24. The apparatus of claim 14 further comprising:
a probing circuit coupled to the controller and an output of the dimmer, wherein the probing circuit comprises a controllable constant current source, wherein the control signal controls the constant current source so that the constant current source generates a current through the dimmer to prevent the triac from disconnecting prior to reaching a predetermined voltage level.

25. The apparatus of claim 14 wherein the controller is further configured to operate the switching power converter in accordance with information derived from the sensed output voltage of the dimmer to control at least a brightness of one or more lighting devices.

26. The apparatus of claim 25 wherein the one or more lighting devices include one or more light emitting diodes.

27. An electronic lighting system comprising:
a switching power converter;
a controller, coupled to the switching power converter, to control energy transfer in a switching power converter of a lighting system, wherein the controller is configured to:
during control of energy transfer in the switching power converter, generate a control signal to control probing an output of a triode for alternating current ("triac") based dimmer only every Nth half cycle of an alternating current (AC) output voltage of the dimmer to allow the controller to sense the output voltage from a time when the triac connects an input voltage source to an output of the dimmer until an occurrence of a predetermined event, wherein N is an integer greater than 1; and
an electronic lighting device, coupled to the controller and the switching power converter.

28. The electronic lighting system of claim 27 wherein the electronic lighting device comprises one or more light emitting diodes.

29. The electronic lighting system of claim 27 wherein the switching power converter is a two stage switching power converter.

30. The electronic lighting system of claim 27 wherein the predetermined event is a time when the triac disconnects the input voltage source from the output of the dimmer.

31. The electronic lighting system of claim 27 wherein the predetermined event is when the output voltage reaches a predetermined threshold value.

32. The electronic lighting system of claim 27 wherein N varies over time.

33. The electronic lighting system of claim 27 wherein N is a constant.

34. The electronic lighting system of claim 27 wherein the controller is further configured to detect an approximate zero crossing of the output voltage of the dimmer from the sensed output voltage of the dimmer.

35. The electronic lighting system of claim 27 wherein the controller is further configured to detect a type of the dimmer from the sensed output voltage of the dimmer.

\* \* \* \* \*